United States Patent [19]
Richard, III

[11] Patent Number: 5,654,751
[45] Date of Patent: Aug. 5, 1997

[54] TESTING JIG AND METHOD OF TESTING VIDEO USING TESTING JIG

[75] Inventor: Arthur A. Richard, III, Springfield, Va.

[73] Assignee: Bell Atlantic Network Services, Inc., Arlington, Va.

[21] Appl. No.: 454,669

[22] Filed: May 31, 1995

[51] Int. Cl.$^6$ .................................................. H04N 17/00
[52] U.S. Cl. ........................ 348/192; 348/10; 370/241; 371/20.4
[58] Field of Search ........................ 364/550, 551.01, 364/579; 348/180, 441, 192, 558, 6, 10; 371/21.2, 21.3, 22.2, 24, 25.1, 20.4, 20.6, 57.1, 57.2; 370/13, 94.2, 99; 395/185.02; H04N 17/00

[56] References Cited

U.S. PATENT DOCUMENTS

| | | | |
|---|---|---|---|
| 4,377,822 | 3/1983 | Noirel | 348/180 |
| 4,493,073 | 1/1985 | Witmore et al. | 370/14 |
| 4,631,691 | 12/1986 | Pica | 364/521 |
| 4,821,269 | 4/1989 | Jackson et al. | 371/16 |
| 4,953,195 | 8/1990 | Ikemori | 379/33 |
| 5,010,403 | 4/1991 | Wardzala | 358/139 |
| 5,097,469 | 3/1992 | Douglas | 371/20.1 |
| 5,121,342 | 6/1992 | Szymborski et al. | 364/514 |
| 5,187,575 | 2/1993 | Lim | 370/13 |
| 5,208,666 | 5/1993 | Elkind et al. | 358/139 |
| 5,208,803 | 5/1993 | Conforti et al. | 370/13 |
| 5,221,967 | 6/1993 | Ward et al. | 358/139 |
| 5,251,204 | 10/1993 | Izawa et al. | 370/13 |
| 5,301,050 | 4/1994 | Czerwiec et al. | 395/110 |
| 5,309,428 | 5/1994 | Copley et al. | 370/17 |
| 5,499,050 | 3/1996 | Baldes et al. | 348/180 |

OTHER PUBLICATIONS

Daniel D. Briere, "Quality is in the eye of the beholder", Telephony, Jan. 2, 1995, pp. 19–24.

*Primary Examiner*—John K. Peng
*Assistant Examiner*—Jeffrey S. Murrell
*Attorney, Agent, or Firm*—Lowe, Price, LeBlanc & Becker

[57] ABSTRACT

A testing jig is comprised of a circuit board which replaces and emulates the data transfer between a network interface module and a decoder engine of a settop box in a digital network. The testing jig receives the encoded video output of an encoder used in the network and converts the protocol of the encoded video directly into the protocol used for data transfer between the network interface module and the decoder engine, thus bypassing all of the elements in the network between the encoder and the settop box and facilitating the testing of the video output by an encoder or the decoding performed by a decoder engine of a settop box.

26 Claims, 5 Drawing Sheets

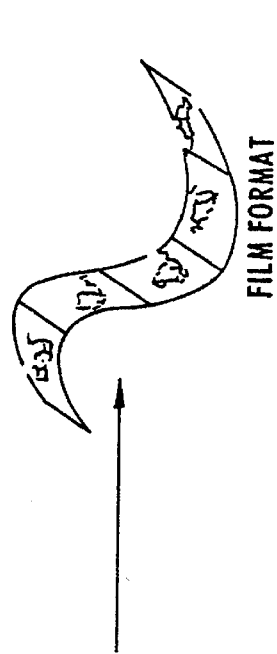
Figure 1A
PRIOR ART
SOURCE
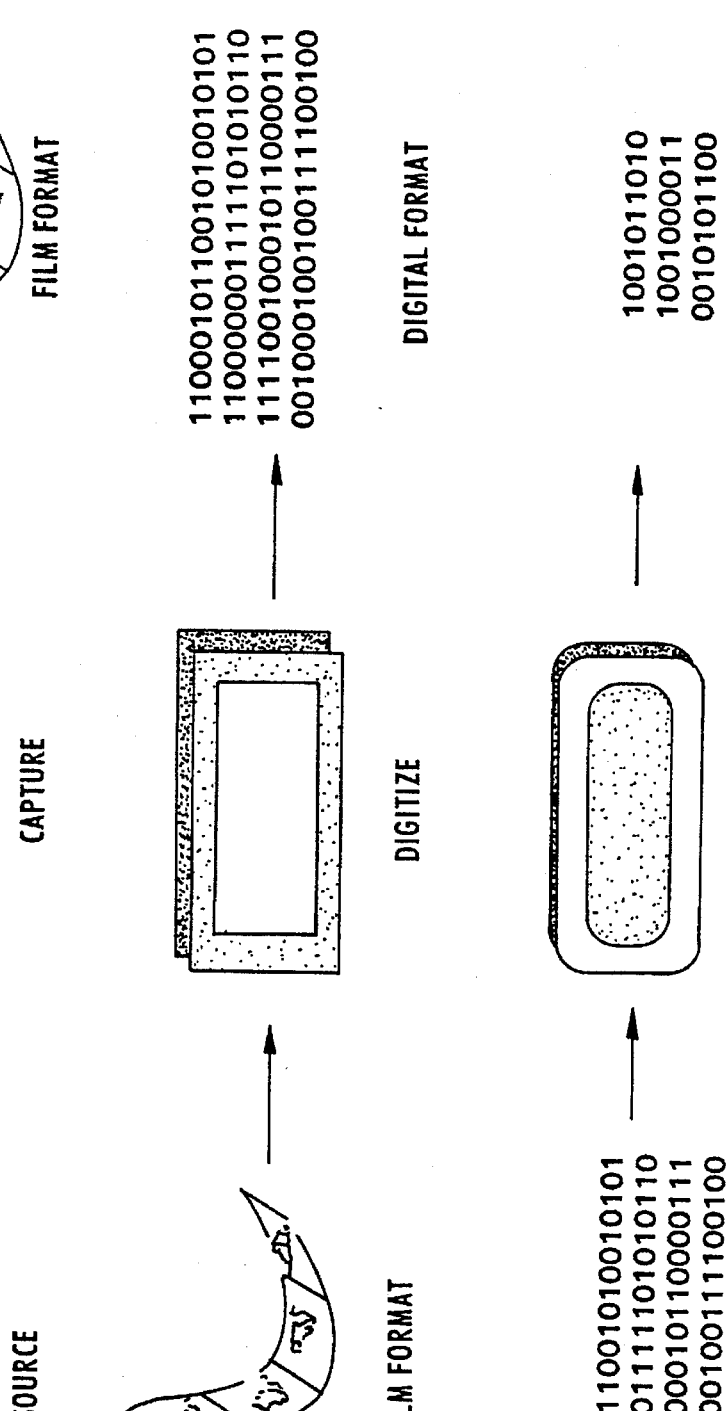
Figure 1B
PRIOR ART
FILM FORMAT / CAPTURE / DIGITAL FORMAT
Figure 1C
PRIOR ART
DIGITAL FORMAT / ENCODE / ENCODED FORMAT

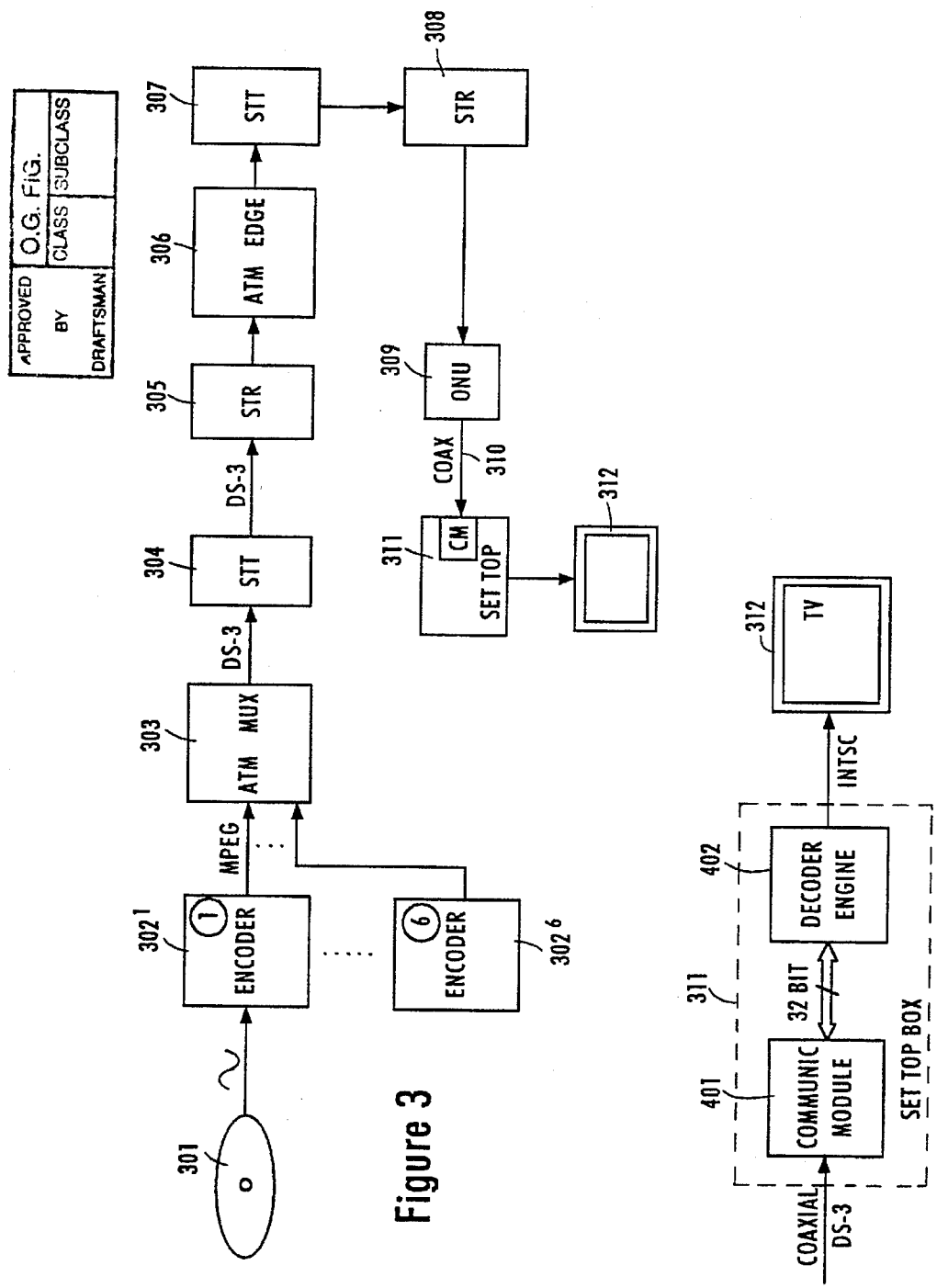

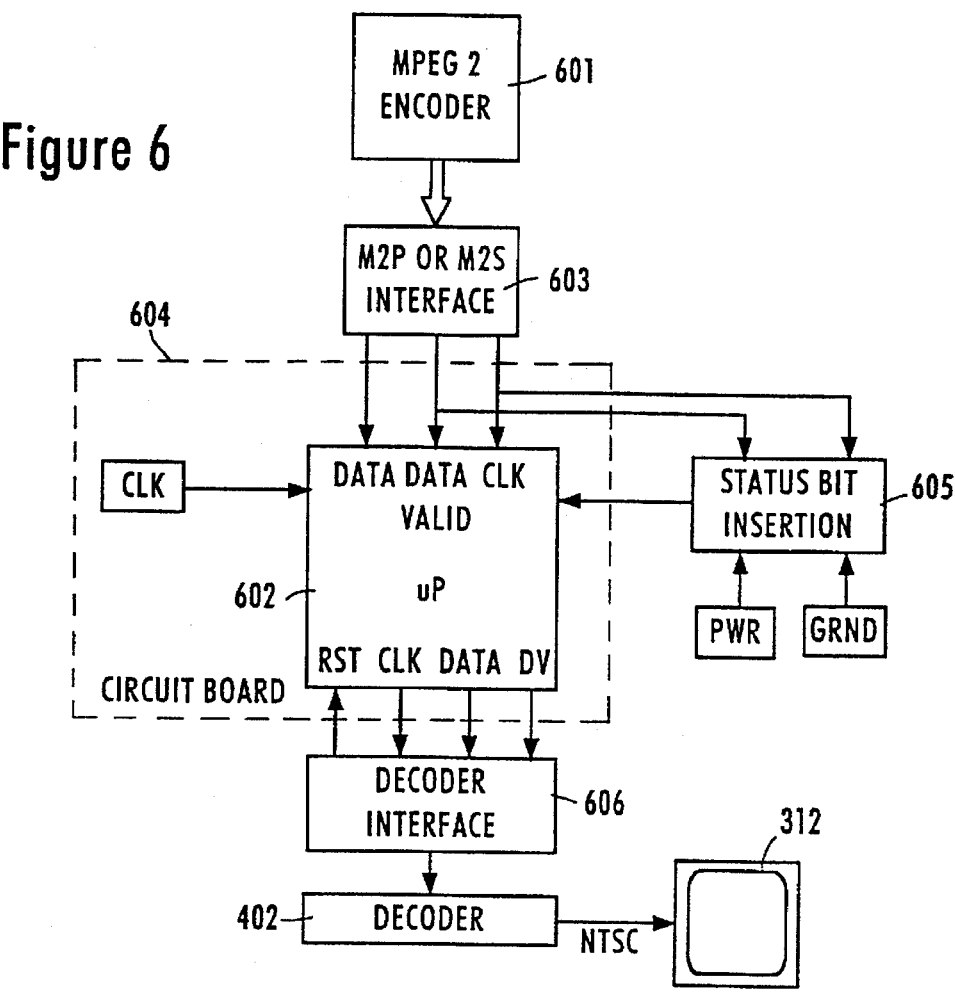
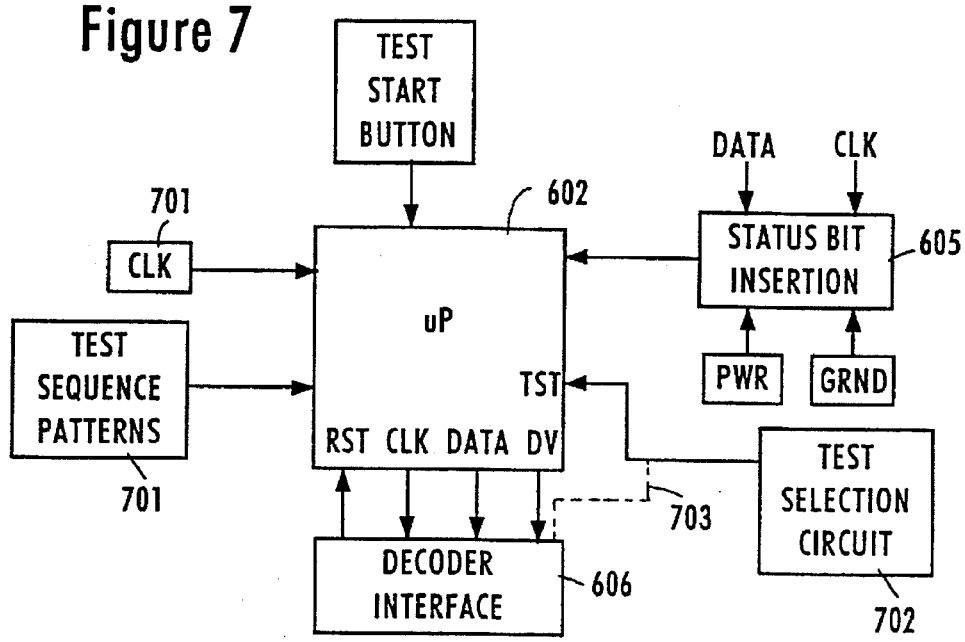

TESTING JIG AND METHOD OF TESTING VIDEO USING TESTING JIG

FIELD OF THE INVENTION

The present invention relates to the testing of compressed digital video and, more particularly, relates to the testing of compressed digital video present within or intended to be used within a network or distribution system transporting compressed digital video.

BACKGROUND OF THE RELATED ART

Historically, the determination of the quality of video material has been via the subjective impression of a test audience of "non-expert" viewers. This testing has involved various CCIR recommendations for screen size, viewing distance, viewing height, ambient lighting and calibration of color temperatures of the test monitors. The results have been expressed in the CCIR-500 scale of five levels:

5=Imperceptible (in terms of noise)
4=Perceptible, but not annoying
3=Slightly annoying
2=Annoying
1=Very annoying However, different persons will interpret noise, color, hue, brightness and contrast parameters quite differently. Hence the subjective rating of the material will vary greatly over a group of viewers even in the same viewing conditions.

Recent efforts to transmit video over limited bandwidth mediums, such as telephone lines, switching and multiplexing equipment have shown that it is likely to require sacrifices and/or tradeoffs in the quality of the video material. For example, it has become customary for video material to undergo compression in order to obtain compressed video material which may more easily be transmitted over limited bandwidth mediums. Therefore, the quality of the video delivered by a transmission system to an end user is limited by the quality of the compressed video material that it is input into the transmission system.

The Motion Picture Experts Group (MPEG) have developed frame oriented compression standards called MPEG1 and MPEG2 in which redundant information is encoded once and updated as the information changes. Subjective testing of the MPEG1 algorithm using the five category method of the CCIR 500 scale has indicated that the MPEG1 encoded video is generally less acceptable than broadcast NTSC video, and only slightly less acceptable than video produced by a consumer grade VHS type VCR. MPEG2 encoded video was found to be generally equal to broadcast quality video. However, MPEG is merely a standard format and does not guarantee the level of quality in an MPEG encoded video signal. There are a number of different compression algorithms which satisfy MPEG transmission requirements, but which may nevertheless provide encoded video of substantially different quality.

Furthermore, the production of digitally encoded video is typically a multi-step process, illustrated in FIG. 1, of capturing source material, digitizing that material and encoding it using a compression algorithm such as MPEG1 or MPEG2. Notwithstanding the emergence of video compression standards such as MPEG, compressed and encoded video may easily have significantly different levels of quality. The encoding process is even more likely to result in digital video having poor quality when the quality of the underlying analog video has deteriorated to the point shown in FIG. 5 thereby necessitating that the digitized video must be restored in addition to being encoded.

Traditional analog domain testing, such as short haul, medium haul, long haul, EIA-250 testing with color bars and wave forms testing, does not indicate how a digital network is working because it is geared toward an analog stream instead of a digitally encoded stream. For example, a color bar might be input into an encoder and come out with a different color which can then be measured. But such a test does not measure the capability of the encoding process to deal with the problems normally associated with highly compressed digital video such as detailed information and motion. Such defects are significant since motion in compressed video is a much more difficult characteristic to capture than anything else.

Known video encoder testing equipment use the H.261 standard for video conferencing and employ algorithms for the tester which are somewhat subjective. More importantly, known video encoder testing equipment is based on analog domain testing and does not test in the digital domain.

Efforts have been made to obtain a quantitative system in which findings in the CCIR-500 scale can be replicated using digital measurements. A company called StellaCom has a prototype system in which they evidently test the viability of a decoded signal based on H.261 by showing differences between the original video and the decoded digital video. However, the system is still believed to be less than successful since there is no way to take measurements while the video is still in the digital domain. The video always has to be converted back into the analog domain to take the measurements.

Therefore, a quantitative measurement system for digitally encoded video is believed to be desirable in order to effectively and efficiently test and accept a large amount of encoded video material.

Nevertheless, the primary concern of known testing systems has been in determining the quality of virgin encoded video which is derived from non-anomalous baseband video using a single compression algorithm and which is tested without first being transmitted in a distribution system. Even if the virgin video is of high quality, it may be compromised when it is input into or utilized in a digital network since the digital network itself may adversely affect the quality of the encoded video and introduce errors into the digital video signal received by the end user.

For example, asynchronous transfer mode (ATM) has been developed as a technique to provide broad-bandwidth, low delay, packet-like switching and multiplexing of digital video in backbone networks. In ATM, usable capacity can be assigned dynamically (on demand) by allocating bandwidth capacity to supply fixed-sized information-bearing units called "cells" to point-to-point or multi-point outputs. Each cell contains header and information fields. The ATM standard, CCITT.121/2 specifies a 53 byte cell which includes a 5 byte header and a 48 byte payload. Unfortunately, much of the equipment in a network, such as settop boxes and other customer premises equipment, cannot accept ATM and utilize an MPEG (moving picture experts group) standard for digital video program compression.

It is therefore necessary to adapt MPEG encoded video data into data in the ATM cell format and to then readapt the data in the ATM cell format back into MPEG encoded video data. The process of adapting MPEG-2 data into ATM cell format, however, imposes additional overhead requirements that reduce the information-carrying capacity of the network. Furthermore, the network may encode video program material into channel streams of say, 6 Mbits/sec, and packetize a number of 6 Mbits/sec channel streams into a single higher rate signal transport stream. Synchronous transmission protocols, such as SONET, may require a stream of continuous data to retain synchronization. Thus, an ATM data stream carrying MPEG video data that is transmitted on a synchronous carrier, even if padded with ATM idle cells, or "dummy cells", may not be able to maintain proper synchronization with the physical layer.

In a large network, there is immensely complicated provisioning, such as VPI/VCI provisioning, trunk assignment provisioning, etc., which has to be done correctly in order for video connections to be error free. It is quite possible to have an encoder which operates correctly and a decoder which operates correctly, but have something somewhere in the network that is not configured correctly and thus interrupting the video signal. It is very difficult to locate the point in the network which is causing the error.

It is also quite possible that the virgin video coming out of encoder and input into a complicated digital network might be severely degraded in quality when it is received by the end user after transversing the network. However, it is not possible to easily determine the part of the network which is causing the degradation because of the different formats and protocols used throughout the network. For example, the output of an encoder is frequently not in the same format as the input of a settop box even though they are both used in the same network. Therefore, it is not possible to take the settop and simply hook it up to an encoder to see if the encoder and the settop work properly when the other parts of the network are removed.

In general, the encoder and the communication path that the entire network runs over hinges on an interface between the network and the end user's settop or DET. This interface is the interface through which all of the data traffic has to flow. Although the formats and protocols that apply to the outputs of the video information providers, encoders and multiplexer at the head end of the network and the settop box at the bottom end of the network are normally standardized, the interface may be peculiar to the network and there may be certain communication parameters which must be set in that stream for the network interface module to be able to decode all of that information.

Recent improvements have further complicated the testing of compressed digital video in networks. For example, early encoding of video programs frequently took long periods of time and consequently had to be conducted off-line and provided to the network in a pre-encoded, compressed, format. The process of encoding the video data in such off-line situations, however, made it possible to manage and optimize the compression algorithm through non-linear or recursive techniques such as pre-processing, post-processing, and store and forward processing, thereby improving the quality of the resulting encoded video. It also was not objectionable if the encoding process did not output encoded video at a constant rate since it was possible to compensate for time differences after the encoding process was finished and to furnish a stored video file.

The recent introduction of "real time" MPEG 2 encoders now permits the immediate distribution of video which is not previously encoded and live action video such as sporting events, etc., over limited bandwidth networks. Although referred to as "real time" encoders, there is inevitably some sort of delay introduced when video is captured and processed in order to compress it and to digitize it. The delay may be as high as two seconds and may be even longer if more functionality is added to the encoder. The delay is also increased by whatever other delay the network imposes, and the total delay will be delivered to the television set. The acceptability of such delays might depend on the video content. Delays might be unacceptable, for example, in the video transmission of horse races to off-track betting locations. On the other hand, a long delay would be inconsequential when transmitting a movie.

Typically, a real time encoder is not able to store the video in order to do further processing on it and all the processing is done on the video only once as it's going through the system in a single pass. This and other constraints imposed on processing required to capture video, immediately encode and output encoded video at a constant rate severely handicaps the quality of the encoded video which is produced when compared to the encoded video produced by an off-line stored file.

Furthermore, a stored MPEG 2 video stream may differ in material respects from a real time MPEG 2 video stream because MPEG 2 relies upon program clock references (PCRs) to provide proper timing for the encoded video signal and avoid the problems of flickering. It is more difficult for real time encoders to produce an encoded video signal having the proper timing. The program clock references are more likely to be irregular in a real time encoded video signal than in a store and forward video signal.

There may also be compound compression problems when video is transmitted twice before it is received by the viewer. For example, video material may be forwarded from a program source such as HBO to a local distributor by compressing the video, sending it up to a satellite, bringing it back down, and decompressing it. The local distributor then compresses the video again, perhaps using a different algorithm, and distributes the video locally, which is then decompressed a second time by the each end viewer's equipment. So there may be compound problems caused by a first compression and decompression process occurring in front of a second compression and decompression engine. A defect or anomaly in compressed video may initially be minor or insignificant, but become quite significant when the video is exposed to a compression a second time.

BRIEF SUMMARY OF THE INVENTION

Accordingly, it is an object of the invention to provide a stand alone system to quantitatively measure and test digitally encoded video material.

It is also an object that the system accept a video stream from a D1 source and an encoded bit stream from a digital communications channel, an exabyte source or attached storage medium.

It is an object to isolate a vast part of the network so that the main components such as the encoder, mux and settop may be isolated and tested to determine whether they are working properly.

It is an object to provide a virtual decoder that emulates a benchmark decoding performance so that the object of the test is not the decoding function, but rather the encoded video stream. The virtual decoder should be scalable to either MPEG I or MPEG II algorithm standards.

It is a further object to provide a quantitative measurement system which allow the user to simultaneously view a D1 video source, and the encoded (MPEG I or MPEG II) version of that source in real time and measure the spatial and temporal characteristics of the encoded bit stream with relation to the D1 source on a frame by frame basis. All measurement options should be available to the user and displayed graphically while the two sources, the original and the encoded, are being viewed.

It is a further object to provide a system which is able to generate performance reports on the encoded video stream, identifying the frame ranges (by frame number) where the encoded video streams fall below the preselected performance thresholds.

In order to produce a frame by frame analysis and frame range identification of less then satisfactory encoding, the system must be able to correlate references in the digital video bit streams of both the encoded and original material. This is critical in that the representative encoded material for any given segment of original material is comprised of much less information than the original source. A method of tracking between the two is implemented so that any range of encoded source can be traced back to the original extracted from original material.

This concept is represented in FIG. 2 where the frame range is represented by T1 to T2. The compressed, encoded bit stream may represent only 1/100 of the information found in the original material, depending upon the encoding method used. The frame marking of T1 in the encoded stream must correspond to the T1 frame of the original stream that has been encoded. Further, the T1 marking in the encoded stream should correspond to an Intraframe, a frame that includes all of the information of the source frame, rather than a predictive frame, a frame that contains only delta information from the original frame.

The Intraframe should be identified because it sets the reference for all the encoders predictive processing of the subsequent frames, until the next Intraframe is used. The Intraframe (T1) points back to the beginning of the original material to be re-encoded with the appropriate adjustment to spatial or temporal domain characteristics. Original material must be used in the re-encoding process because all of the original information is required for the re-encoding to correctly represent the scene.

In order to achieve the above objects, a preferred embodiment of the invention is a jig or circuit board which interfaces with an encoder to facilitate the analysis of the digital video output of the encoder and the performance of a decoder. The analysis includes conformance and quality testing of the digital video.

The analyzer may be inserted in the system to provide a bypass from the encoder directly to a set top box. In the preferred embodiment, the set top box is made up of two pieces. One piece is called the network interface module (NIM) and the other piece is a decoder engine which decodes the video and audio and synchronizes them. The network interface module interfaces with the network and receives the video signal from the network via a coaxial cable, fiber optic link, phone line or other transport medium. The NIM may or may not demodulate, demultiplex or perform other pre-processing prior to forwarding the signal to the decoder engine.

The NIM is preferably in the form of a circuit board. The pin interfaces of the test circuit board match those of the NIM and the NIM is easily replaced by the test circuit board for testing. Following this replacement, the decoder engine in the set top is directly fed by the test circuit board which, in turn, is fed the output of the encoder. The network is thus by-passed. This permits the analog video going into the system at the encoder to be viewed at the output of the set top or DET. This tests the set top.

A modification of this embodiment involves storing a known quantity of MPEG encoded video on the test circuit board. This modification allows the test jig to be plugged into the set top and the stored video to be run to make certain that the system is decoding properly. This may be done at the customer premises or elsewhere.

Another embodiment involves a portable test unit, either resembling or constituting a laptop computer, to be plugged into the network at multiple interfaces. This test unit includes both a virtual decoder and a virtual encoder including a processor and software for per frame analysis. There may be different models or different software for decoders to test the encoders of different manufacturers. The test unit may include the functionality of a NIM and the capability of coupling to various network interfaces. This provides isolation of the network, the decoder and the known quantity of the decoder. Also, since the device is mobile, the various points of the network can be isolated to provide different interfaces. This would allow testing of the actual ATM switching fabric to see if there is any cell loss or irregularity being encountered. Severe cell loss or irregularity may result in a black-out or white-out of multiple consecutive video frames or other disruptive attributes, such as video shredding, in the discrete video streams. Video "shredding" is analogous to the shredding of paper and includes defects in the displayed picture such as the blinking in or out of the video picture, drop outs or destruction of part of the picture, lines through the picture, etc.

The network may utilize an MPEG transport stream which involves video, audio and user data running on a communications protocol called M2S. The transport stream is mapped into AAL5 ATM packets, and up to six transport streams are multiplexed into a single bit stream using an ATM multiplexer. The bit stream is then converted into a DS3 signal which goes to an STT (super trunk transmitter) and is passed on to a STR (super trunk receiver). The data then goes to an ATM Edge device which will groom it. After grooming the data goes to another STT and leaves there as OC3. It is then received by another STR and undergoes optical to electrical conversion.

Thus, in summary, the test interface will allow the encoder to "talk" to the set top box by bypassing the network. A stored video can be included in the test interface, allowing the unit to become portable. This will allow the isolation of performance faults at either the set top box, the network or the encoder. This flexibility can be expanded so that the test unit can be incorporated into the system so that at any given point in the network where performance characteristics can be monitored and isolated. This will permit the tying of certain performance anomalies to known causes such as jitter, packet loss, ATM mapping variants, etc. If the quality of the encoded material were to be tested, a virtual encoder or virtual set top would be applied. This could be done by software; and the settop box, being a known quantity in terms of performance, would indicate how well the encoder is doing. The results can be plotted against established baselines.

BRIEF DESCRIPTION OF THE DRAWINGS

FIG. 1A–1C are an illustrative diagram of the digital video encoding process.

FIG. 3 is a simplified block diagram of an exemplary network in which the test unit of the preferred embodiment might be implemented.

FIG. 4 is a schematic diagram of a settop box used with a preferred embodiment of the invention showing the interface between the network interface module and the decoder engine.

FIG. 6 is a block diagram of a preferred embodiment of the test unit of the present invention.

FIG. 7 is a block diagram showing a modification of the preferred embodiment of the present invention.

DETAILED DESCRIPTION OF THE PREFERRED EMBODIMENT(s)

Figure 2:
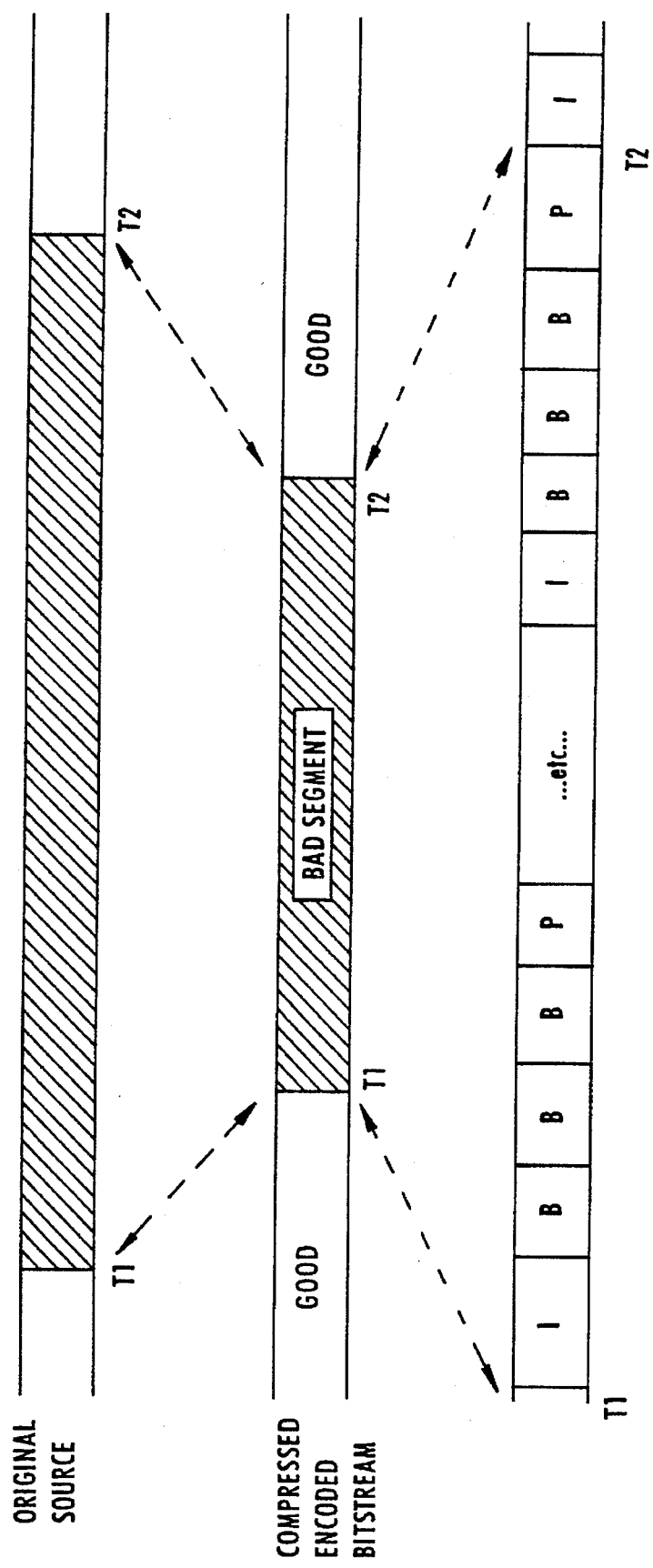
FIG. 2 is an illustrative diagram useful in explaining the effect of poor quality video source material on the digital video encoding process.
Figures 5A, 5B:
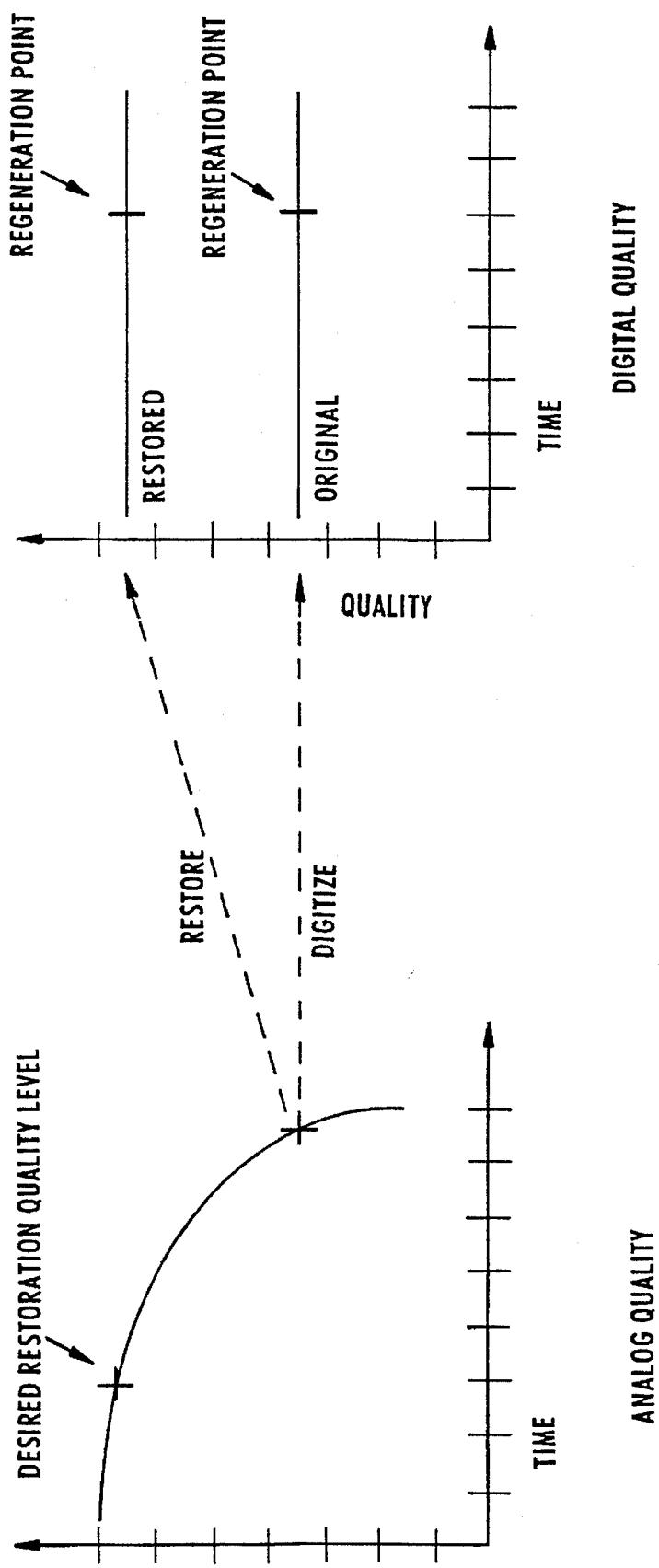
FIG. 5A and 5B are an illustrative diagram of the relationship between analog and digital film quality and time.

FIG. 3 shows a simplified block diagram of an exemplary fairly complex network in which the test unit of the preferred embodiment might be implemented.

Element 301 is a laser disk player or other video information provider of NTSC baseband video input. The video is input into an encoder 302, which compresses and digitizes the signal into MPEG 2. A typical encoder system includes six encoders $302^1$ to $302^6$. Encoder 302 may have a digital input module to accept digital input coming off a D1 machine or something similar. It will also accept PAL, SECAM and other standards in the analog domain. Encoder 302 may be a real time encoder which is capable of receiving live action or unencoded video and producing an MPEG 2 encoded output with a small delay of about three seconds or less.

Preferably, each of the encoders produces a M2S compliant real time encoded video program at, for example, 6 megabits per second. The signal is available at either a parallel output or a serial output. A DB25 interface provides the parallel output. The serial connection is a MPEG 2 transport stream that runs under a proprietary data communications protocol of Cypress Semiconductor Corporation called HOTLink. A HOTLink transmitter, HOTLink receiver and HOTLink Evaluation card with any one of a coaxial, twisted pair or fiber ineterface is available from Cypress Semiconductor Corp. In the preferred embodiment of the present invention, the serial output of the encoder is a fiber coupler output.

The output is selected by a system controller set up to run HP Openview to provide an Ethernet message to each of the encoders indicating that an output port is to be activated and logically connected to a certain device. HP Openview is a system control software that merely looks for and controls devices responsive to a Simple Network Management Protocol (SNMP). Therefore, any SNMP compliant device can become part of the HP Openview hierarchy. In the preferred embodiment of the present invention, each one of a limited number of encoders are connected to and controlled by the system controller. Since each encoder is assigned a respective Internet Protocol compliant address, the communication between elements of the control network may be made by any means selected by the network operator. However, it is preferred that the encoder control network controlled by a system controller is a closed Ethernet network with a well defined IP address scheme.

The output of encoders $302^1$ to $302^6$ go into ATM multiplexer or remultiplexer 303. The multiplexer 303 is a complicated matrix which takes up to six encoder channels and bundles them into a single DS-3 stream of 45 megabits per second. The multiplexer 303 may be included in the Ethernet control network with the encoders and the system controller. However, no devices other than the encoders and the multiplexer are on the same Ethernet network with the controller.

ATM multiplexer 303 adapts the encoder channels into ATM cells using ATM adaptation layer 5 (AAL5). Coming out of the mux 303 is a DS-3 bit stream containing six MPEG 2 transport streams. The mux 303 supplies the DS-3 bit stream to a super trunk transfer (STT) 304 which is a Broadband Technology (BBT) asymmetrical fiber based system used for cost considerations rather than a two-way DS-3 line. Although only one set of sources 302 and one associated mux 303 are shown providing a signal DS-3 input, the preferred STT is capable of receiving up to sixteen DS-3 bit streams. The STT 304 combines those DS-3 rate bit streams into a single higher rate bit stream (e.g. by interleaving the bit streams), converts that electrical stream into an optical signal stream, and transmits the optical stream over a fiber. The individual channels in STT 304 identified by the virtual path indicator/virtual circuit indicators (VPI/VCI) in the ATM protocol, which are used to describe addresses in the network. The optical fiber output of STT 304 goes into a super trunk receiver (STR) 305, preferably located somewhere in or near a telephone company central office, and into an ATM edge device 306.

The edge device 306 first polices each individual channel by looking at its VPI/VCI values and determining if it is occupying the bandwidth it should occupy and appearing at an agreed upon traffic rate. Each channel at 6 megabits per second is expected to be able to offer 16,000 cells per second. If the channel is offering 16,010 cells per second, 10 cells have to be dropped or the channel is going to end up stealing bandwidth from another channel.

Once the policing function is complete, edge device 306 will perform what is known as a grooming function. It will reallocate bandwidth in order to efficiently use the bandwidth coming out of the other side of the edge device 306. For example, a video information provider (VIP) may only want two channels of 6 megabits rather than six channels for DS-3. Instead of occupying an entire DS-3 just for that VIP, that traffic will be bundled with someone else's traffic to fill up the DS-3s as much as possible. The ATM edge device may comprise a relatively small capacity ATM switch. A more detailed description of the ATM edge device and its operation is disclosed in commonly assigned U.S. patent application Ser. No. 08/380,744, filed Jan. 31, 1995 entitled "Full Service Network Using Asynchronous Transfer Mode Multiplexing" (attorney docket no. 680-109), the disclosure of which is incorporated herein in its entirety by reference.

The output of edge device 306 will go back into another super trunk transfer 307, and the output of super trunk transfer 307 will go via optical fiber to yet another super trunk receiver 308 somewhere distant from the central office of edge device 306. (Super trunk receiver 308 is actually an element within an HDT performing other functionality as well.) There's another conversion from the super trunk receiver 308 from fiber into coax 310 using an optical network unit (ONU) 309. Leads from coax 310 will finally show up in a settop or digital entertainment terminal 311. Settop 311 performs the decoding, returns the video to NTSC format, and forwards it to television 312 for presentation to the viewer.

Although not shown in the simplified diagram, there is a video administration module (VAM)/VPI software-based management system containing a rather complex setup of software that controls most of the illustrated devices and manages and governs a lot of the transactions in the network.

The management system gives information to the encoding system of MUX 303 so that video programs are assigned to certain channels and corresponding VPI/VCI values are made for the video programs. It may accept manual video program assignments or it may assign the video programs automatically. The management system also talks to edge device 306 to let it know what VPI/VCI values are important and provisions settop 311 to let the settop know which channels it can receive and which channels it cannot receive.

There may also be some kind of operation support system (OSS) which limits the VAM, and it may include manual operations by OSS personnel working with the VIP and prorating the VAM to provide the network with additional functionality.

While this management system and other non-illustrated systems are not shown, it is to be understood that such systems must be present to make the network work in concert to provide service and that they add to the complexity of diagnostics necessary to test the network, all of which is eliminated by the test unit of the preferred embodiment although the test unit does not necessarily emulate the VAM or any other systems in the network. A more detailed description of the network of FIG. 3 appears in commonly assigned U.S. patent application Ser. No. 08/380,758, filed Jan. 31, 1995 entitled "VPI/VCI Administration" (attorney docket no. 680–123), the disclosure of which is incorporated herein in its entirety by reference.

FIG. 4 is a schematic diagram of settop box 311 showing network interface module (NIM), which handles all of the communication with the network, and a decoder portion. In the network shown in FIG. 3, the network interface module (NIM) receives three DS-3 channels over a coaxial cable of 188 megabits per second capacity. Each DS-3 includes six ATM virtual circuits. The NIM reverse adapts all six, processes the ATM and decides which one of those three DS-3 channels will go into the settop based upon channel requests from the settop based on PID values and program specific information (PSI), and the program mapping table.

There may be several orders of demultiplexing which have to be done in the end user's equipment in addition to channel selection. The network interface module will contain an MPEG demux because it is receiving an MPEG 2 super transport stream that includes six separate transport streams. There is also a demux in the decoder for selecting one of the six elementary transport streams. The NIM hands off the data packets constituting all six channels of a single DS-3 MPEG 2 transport stream to the decoder portion of the settop box in a single transport stream. The channels are not separated from each other and are defined by PID values identifying the actual packets making up the channel. Each channel has it's own program mapping table (PMT) values.

There is no selection by the decoder portion based on VPI/VCI. The decoder only cares about PID values and MPEG 2 transfer responsive to the program identifiers. Only the NIM, the STR/HDT and the edge device are concerned with VPI/VCI. There is a hierarchy of channel change involved in the network. Only if the new channel is in the same DS-3, is the channel change handled at the DET level by switching the PID values the DET is looking for data.

The jig in a preferred embodiment of the invention emulates a 45 megabit per second stream containing six MPEG programs over the DET to NIM interface. The rate of the MPEG 2 transport streams does not matter. Whatever is encoded, the settop should be able to rate adjust up to some reasonable limit, such as 10 megabits per second. However, only a single MPEG stream is provided by the jig. In a cable application mode in which the jig emulates a cable television system, there is an application that runs on the DET that equates channels to PID values and decodes only certain PID values. In diagnostic mode, the DET decodes whatever PID value is coming over the interface.

The structure and operation of the settop box used in a preferred embodiment of the invention to receive, decode and forward the video to television 312 is shown in FIG. 4. The network interface module 401 is a daughter board with a 34 pin standard interface connection that goes into the decoder engine 402. Three of the pins into the decoder engine 402 are a clock pin, a data valid indicator pin and a data bus pin. The data valid pin is rated high when the correct PIDs are going to be coming through and the correct information is there. The data pin is the data channel having the actual data of the selected MPEG transport stream. There is a fourth pin for out of band signaling from the decoder engine 402 to the NIM 401 to identify a desired channel, although it does not need to be emulated in the test jig. From the network comes 188 megabits per second over coaxial cable which contains three 45 megabit channels that carry the HDT, VDT and all of the ATM protocol and overhead.

The test jig copies the network interface module interface at the physical level, and instead of the BBT 188 megabit connection, uses MPEG 2 serial (M2S), which is a proprietary protocol. The preferred embodiment of the testing jig contains a test circuit board which operates with the same specifications as the interface shown in FIG. 4 and accepts M2S straight from an encoder.

FIG. 6 is a block diagram of the circuitry on the test circuit board in a preferred embodiment of the invention. Element 601 is an MPEG 2 encoder providing an M2S signal over a DB25 interface 603 to test circuit board 602. From the interface 603, the signals go into an Altera CPU microprocessor 604 providing control and sequencing logic through a program array. The processor 604 performs the conversion from the M2S input at interface 603 into the clock, data and data valid signals expected at the NIM leads of the 34 pin connector to decoder interface 606.

The processor 604 takes the M2S signal, strips off the protocol, and converts it down to a simple MPEG 2 stream. The signal in the test unit goes from CYPRESS HOT-LINKS™ proprietary protocol to compliant MPEG 2 to proprietary MPEG 2 with an anomaly that requires an extra status bit that does not exist in the decoder output. Because of the specifications of the NIM, the testing unit has to provide these signals exactly. The processor 604 therefore also enables the insertion of an extra status bit generated by the off chip signal from circuit 605 that is not MPEG 2 compliant to remain consistent with the specification of the network interface module.

A TV set 312 or any kind of analog test device is connected to the output of the decoder 402 to conduct analysis and/or a visual test. The testing jig can run any signal tests that are standard to the analog testing of NTSC.

In a modification of this embodiment shown in FIG. 7, the encoder input into the testing jig is replaced by a program sequence in a stored logic chip on the board which prompts a fully conforming MPEG 2 encoded video test sequence from memory 701. This modification advantageously eliminates the possibility of a faulty encoder from the testing process and makes it possible to easily test just the decoder. The modified testing jig is plugged into the decoder and the diagnostic is run straight off of the test circuit board.

A signaling path is developed to address the test circuit board to tell it to start the test sequence. Preferably, the channel change pin from the decoder is used so that the test sequence is initiated simply by requesting a channel at the DET and sending a signal over signaling path 703. Alternatively, a button or switch may be provided directly on the testing jig to produce a test start signal from test selection circuit 702 in response to operator selection. The testing jig otherwise remains the same with a three bus lead including a bi-directional data bus and a DS-3 return clock.

Stored software in test selection circuit 702 and memory 701 holds a small amount of code to implement play, start, stop and/or rewind command responsive functions for the MPEG2 test sequence data. M2 PLAY is a software decoder, which when loaded on a Sun system, will cause the system to decode an imported MPEG2 data input stream in software and display it on a screen. The MPEG 2 test sequence could be stored in flash RAM or RAM to allow the replacement of test sequences, or it could be permanently stored in ROM or EEPROM. The test sequence could be of any duration, however it should be optimized for the testing of compressed digital video rather than analog and thus include irregular motion patterns, high frequency information and other characteristics known to test the capabilities of video decoders.

The testing jig in the preferred embodiment also stores different rate test sequences to test the decoder for those different rate patterns that are likely to be implemented in the network. In a video dial tone network, for example, video data is likely to provided at rate of 1½, 3 and 6 megabits per second. A decoder may work fine at 1½ and 3 megabits, but crash at a rate of six megabits per second.

Where the testing jig is receiving an encoder output, the different rates can be achieved by adjusting the encoder or by using different encoders. In the embodiment where the video test patterns are stored, several patterns can be stored corresponding to each rate to be tested or a single test pattern can be outputted at different rates.

In another embodiment of the invention, the input and output interfaces of the testing jig is made to be replaceable or interchangeable so that it may accept many different types of data other than the data direct from the encoder. For example, it could accept optical input from STT 304 or the output of edge device 306. The input could be DS-3 with a 45 megabit channel over coaxial cable. The input could be accepted in whatever communications protocol is appropriate for a particular point in the network to allow for further network testing. The internal processing circuitry of the testing jig and the output to the decoder engine remains the same.

While the testing jig has been described with respect to its implementation in a particular network, a testing jig may also be applied to other digital networks utilizing different standards, communications protocols, and compression algorithms. The testing jig needs only to receive the input of the encoded video source at the head end of the system with appropriate processing circuitry to convert the format or other aspect of the video signal necessary for forwarding video data to the decoder engine of the settop box.

Indeed, except when prohibited by the physical connections, the testing jig may use any one of a number of different algorithms, video test segments, video standards, or other operating characteristics respectively corresponding to a number of different models of settop boxes as well. The testing jig is responsive to information received from the settop box identifying the type and/or model of the settop box. Preferably, the settop box includes a register or other non-volatile memory which stores the identifying information and transfers the identifying information to the testing jig when the settop box is initialized. The testing jig then runs a program that accesses the appropriate compression algorithm, video test pattern or standard, or other operating characteristic appropriate for the identified settop box from internal memory and uses that retrieved data to test the settop box.

Similarly, the testing jig may also emulate the output of several different types or models of encoders. Some video compression standards, such as MPEG, have a great deal of flexibility and different MPEG encoders may have some differences in their output and each still comply with the standard. If a specific type or model of encoder(s) is of particular interest, for example, because it is used or likely to be used at the head end of a network, then the testing jig may be used to test or even optimize the performance of a network or decoder for that specific type or model of encoder. The testing jig would contain a number of different test pattern sequences, each of which correspond to a specific type or model of encoder.

Furthermore, although the testing jig is a circuit board replacing a network interface module in the embodiment described above, the functionality of the testing jig may be implemented in any stand alone circuitry or device which can input video data directly into the decoder engine of the DET, e.g., via a PNIMCIA connection, RS-232 or other input data connection. In such an instance, the only portion of the decoder that would not be tested would be the actual physical interconnection to the network interface module. However, such an embodiment is advantageous because it does not require that the network interface module be taken out and replaced with the testing jig.

Although described above principally in the environment of a particular network, the present invention can test compressed digital video in any network. Although this invention has been described and illustrated in detail in connection with what is presently considered to be the most practical and preferred embodiments, it is to be clearly understood that the same is by way of illustration an example and that the invention is not limited to the disclosed embodiments. To the contrary, the invention is intended to include numerous embodiments, modifications and equivalent arrangements which may be included within the spirit and scope of the appended claims.

What is claimed is:

1. A testing jig for use in a digital network using one or more transmission protocols to transport source video, through an encoder encoding said source video into a first encoded video data signal using a first transmission protocol, to at least one settop box, said settop box containing a decoder engine and a network interface module for receiving and converting said first encoded video data signal into a second video data signal using a second transmission protocol and forwarding said second video data signal to said decoder engine, said testing jig comprising:

an input interface for receiving said first encoded video data signal;

a processing circuit for converting said first encoded video data signal into said second video data signal; and an output interface for forwarding said second video data signal to said decoder engine over said network interface module, wherein said testing jig is configured to be of the same physical configuration as said network interface module and wherein said testing jig tests digital video processing in said network by replacing the network interface module in said settop box.

2. A testing jig as recited in claim 1, wherein said digital network converts said first encoded video data signal into ATM formatted data and transports said ATM formatted data to said network interface module, and wherein said testing jig receives data at said input interface which is not ATM formatted data.

3. A testing jig as recited in claim 1, wherein said first encoded video data signal is in MPEG2 format and said input interface of said testing jig receives MPEG 2 compliant data.

4. A testing jig as recited in claim 3, wherein said encoder is a real time encoder.

5. A testing jig as recited in claim 1, wherein each of said testing jig and said network interface module comprises a printed circuit board.

6. A testing jig as recited in claim 5, wherein said output interface of said testing jig matches the network interface module.

7. A testing jig as recited in claim 1, wherein said input interface is interchangeable and receives data having a format different than the format of said first encoded video data signal.

8. A testing jig as recited in claim 7, wherein said first encoded video data signal comprises ATM formatted data.

9. A testing jig for testing the compressed digital input into and output from a settop box in a digital network transporting source video, said settop box containing a network interface module for receiving and converting data derived from a first compressed digital video data signal having a first format into a second video data signal having a second format and for forwarding said second video data signal to a decoder engine decoding said second video data signal over a NIM interface, said testing jig comprising:

a memory for storing a test sequence of video data of said second format;

an output interface for forwarding the video data of said second format to said decoder engine over said interface module; and a processing circuit for controlling the outputting of said stored test sequence of video data of said first format to the output interface as video data of said second format, wherein said testing jig is configured to be of the same physical configuration as said network interface module and wherein said testing jig tests digital video input into or output from said decoder engine by replacing said network interface module.

10. A testing jig as recited in claim 9, wherein said memory comprises a random access memory.

11. A testing jig as recited in claim 10, wherein said random access memory comprises flash memory.

12. A testing jig as recited in claim 9, wherein said processing circuit outputs said stored test sequence in response to a channel request signal received from said decoder engine.

13. A testing jig as recited in claim 9, wherein said processing circuit outputs said stored test sequence in response to a test start signal generated in response to operator selection of a test start button on the testing jig.

14. A method for testing in a digital network transporting source video through an encoder encoding said source video into a first encoded video data signal using a first format to at least one settop box containing a network interface module (NIM) for receiving and converting data derived from said first encoded video data signal into a second video data signal through a NIM interface and for forwarding said second video data signal to a decoder engine decoding said second video data signal, said method comprising the steps of:

replacing said network interface module of said settop box with a testing jig, said testing jig being of the same physical configuration as said network interface module;

encoding test video into encoded test video data of said first format;

inputting said encoded test video data of said first format into an input interface of said testing jig;

converting said encoded test video data of said first format into test video data of said second format in said testing jig; and forwarding said test video data of said second format from said testing jig to said decoder engine over said NIM interface.

15. A method as recited in claim 14, wherein said network converts said first encoded video data signal into DS-3 ATM formatted data and transports said DS-3 ATM formatted data to said network interface module, and wherein said step of inputting comprises inputting encoded test video data which is not ATM formatted.

16. A method as recited in claim 14, wherein said first encoded video data signal is in MPEG2 format and said input interface of said testing jig receives MPEG 2 compliant data.

17. A method as recited in claim 16, wherein said step of encoding comprises real time encoding.

18. A method as recited in claim 14, wherein each of said testing jig and said network interface module is in the form of a printed circuit board.

19. A method as recited in claim 18, wherein said output interface of said testing jig matches the NIM interface.

20. A testing jig as recited in claim 14, wherein said input interface is interchangeable and receives data having a format different than the format of said first encoded video data signal.

21. A testing jig as recited in claim 20, wherein said first encoded video data signal comprises ATM formatted data.

22. A method for testing the compressed digital input into and output from a settop box in a digital network transporting source video, said settop box containing a network interface module (NIM) for receiving and converting data derived from a first encoded video data signal using a first transmission protocol into a second video data signal using a second transmission protocol and for forwarding said second video data signal to a decoder engine decoding said second video data signal over a NIM interface, said method comprising the steps of:

storing a test sequence of video data compliant with said second transmission protocol in a testing jig, said testing jig being of the same physical configuration as said network interface module;

replacing said network interface module with said testing jig;

forwarding said stored test sequence of video data compliant with said second transmission protocol from said testing jig to said decoder engine over said NIM interface; and controlling the outputting of said stored test sequence of video data compliant with said second transmission protocol.

23. A method as recited in claim 22, wherein said step of storing a test sequence of video data comprises storing said test sequence of video data in random access memory.

24. A method as recited in claim 23, wherein said step of storing said test sequence of video data in random access memory comprises storing said test sequence of video data in flash memory.

25. A method as recited in claim 22, wherein said step of controlling the outputting of said stored test sequence of video data comprises outputting said stored test sequence in response to a channel request signal received from said decoder engine.

26. A testing jig as recited in claim 22, wherein said step of controlling the outputting of said stored test sequence of video data comprises outputting said stored test sequence in response to a test start signal generated in response to operator selection of a test start button on the testing jig.

* * * * *